United States Patent [19]

Morishita

[11] Patent Number: 4,872,750
[45] Date of Patent: Oct. 10, 1989

[54] IMAGE PROJECTION APPARATUS

[75] Inventor: Masanobu Morishita, Osaka, Japan

[73] Assignee: NEC Home Electronics Ltd., Osaka, Japan

[21] Appl. No.: 88,481

[22] Filed: Aug. 19, 1987

Related U.S. Application Data

[63] Continuation of Ser. No. 517,279, Jan. 16, 1984, abandoned.

[30] Foreign Application Priority Data

Jul. 14, 1982 [JP] Japan .................................. 57-122717
Jul. 31, 1983 [JP] Japan .................................. 58-139589
Jul. 31, 1983 [JP] Japan .................................. 58-139591

[51] Int. Cl.⁴ .......................................... H04N 13/04
[52] U.S. Cl. .......................................... 353/7; 352/61; 358/3; 358/88
[58] Field of Search .................... 358/3, 60, 88; 353/7; 352/61

[56] References Cited

U.S. PATENT DOCUMENTS 2,029,300 2/1936 Arfsten ................................. 352/61
3,814,513 6/1974 Nims et al. ............................ 353/7
4,031,542 6/1977 Anderson .............................. 358/60
4,054,907 10/1977 Itoh et al. ............................. 358/60
4,164,748 8/1979 Nagata ................................... 358/3

FOREIGN PATENT DOCUMENTS 110729 6/1940 Australia ................................ 352/61
491578 11/1936 United Kingdom .................. 352/61
1113138 3/1956 France .................................. 358/88
11592 1/1982 Japan .................................... 358/3
67393 4/1982 Japan .................................... 358/3

Primary Examiner—John W. Shepperd
Attorney, Agent, or Firm—Sughrue, Mion, Zinn, Macpeak & Seas

[57] ABSTRACT

A projected image displaying apparatus for displaying bright three-dimensional images on a display screen. In one embodiment, images in three colors, each in the form of vertically oriented stripes, are projected onto a transmissive diffusion surface with the stripes of the three images interleaved with one another, and preferably slightly overlapping one another. A lenticular lens may be employed to direct the three dimensional image to the eyes of the viewer. In another embodiment, the two-dimensional images are projected in a form of three energy beams, which may be infrared, ultraviolet or visible light, onto a light-emitting layer composed of repeating sequences of first through third phosphor stripes, each corresponding to one of the primary colors.

8 Claims, 6 Drawing Sheets

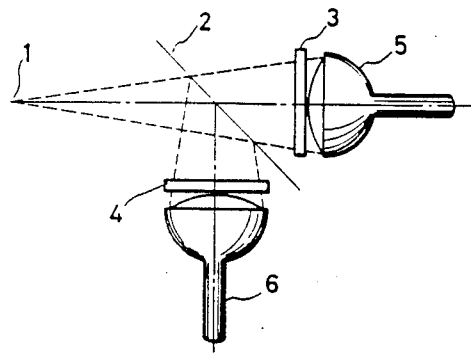
FIG. 1 PRIOR ART
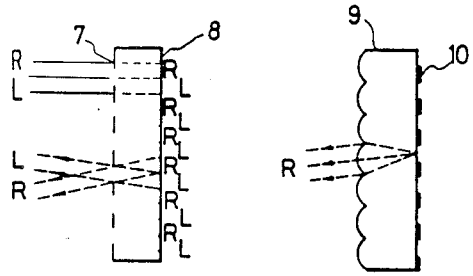
FIG. 2A PRIOR ART
FIG. 2B PRIOR ART
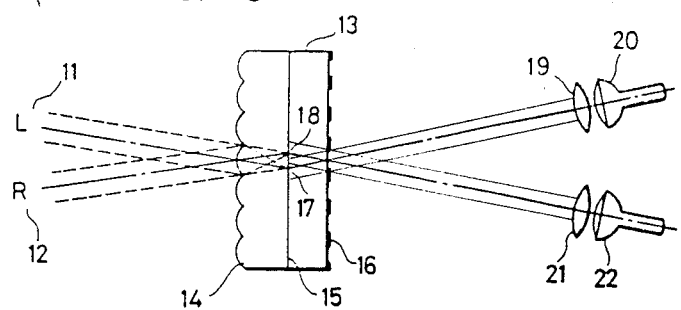
FIG. 3

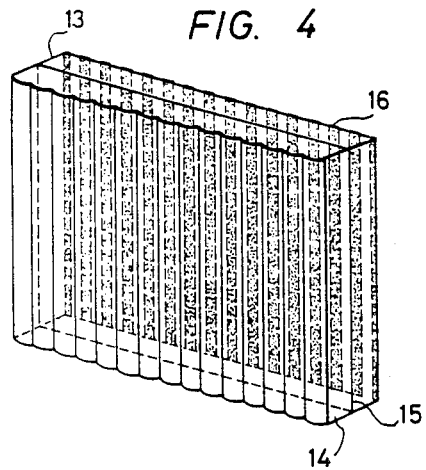
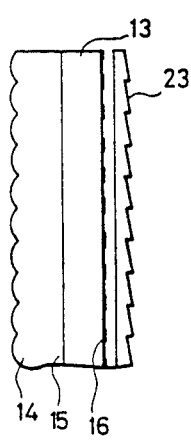
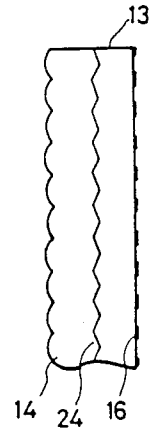
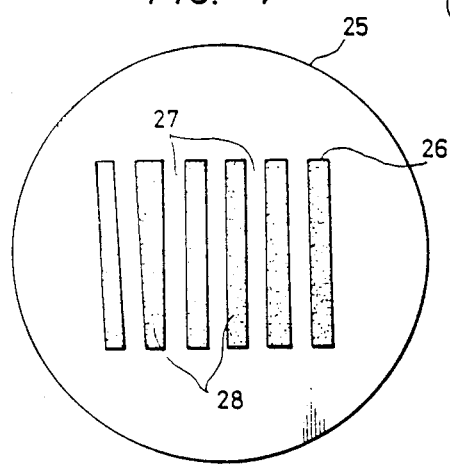

IMAGE PROJECTION APPARATUS

This is a continuation, of application Ser. No. 571,279 filed 1/16/84 now abandoned.

BACKGROUND OF THE INVENTION

The present invention relates generally to an image projection apparatus, and more particularly to a three-dimensional image displaying apparatus capable of displaying three-dimensional images on a screen.

With the advance of information transmission in the form of images, there has been a strong demand in recent years to display images on a large-size screen, and an image projection apparatus have been developed to meet such a demand. The image projection apparatus utilizes, for example, three cathode-ray tubes for producing three primary-color images and includes an optical system for projecting the primary-color images at an enlarged scale onto the screen so that an enlarged image is produced in color by combining the three primary-color images on the screen. In this image projection apparatus, the brightness of the displayed image is determined by the brightness of the image displayed on each cathode-ray tube, and it is difficult to obtain a bright image on a large screen. The prior art image projection apparatus, therefore, has a drawback in that the illumination in the room should be turned down for viewing.

Further, in a conventional three-dimensional image displaying apparatus, special eyeglasses have been required to view displayed images. According to one system, polarizers having directions of polarization displaced 90 degrees from each other are placed in front of two image display tubes for left and right eyes, the two images are combined with a half-silvered mirror, and the viewer views the combined image through eyeglasses having mutually orthogonal directions of polarization. In another system, one image display tube alternately displays images for left and right eyes in successive fields, and shutters are provided for alternately shielding the left and right eyes in synchronization with the alternate display of images. Still another system includes one image display tube for displaying the red and blue components of a color image and one for displaying the green component of the image, and eyeglasses are provided having a filter passing red and blue light for the left lens and a filter passing green light for the right lens. These three-dimensional television systems which require special eyeglasses are disadvantageous in that displayed images suffer from appreciable flickering and the viewer may suffer from eye fatigue after viewing such a display over a long period of time.

FIGS. 1 and 2 of the accompanying drawings illustrate a three-dimensional image displaying apparatus which has been proposed to dispense with special eyeglasses. The illustrated system has been described by Takanori Ohkoshi, *Three-Dimensional Image Engineering*, Japan: Sangyo Tosho Co., Ltd., 1972, pp. 217, 218. In FIG. 1, images displayed by an image tube 5 for the left eye and an image tube 6 for the right eye are combined by a half-silvered mirror 2, and the combined image is viewed from a viewing point 1. A double-layer slit plate as shown in FIG. 2A, or a combining of a slit plate and a lenticular lens as shown in FIG. 2B, is placed in each of positions 3 and 4. With this arrangement, the right eye views an image on the tube 5 and the left eye views an image on the tube 6. Further in FIGS. 2A and 2B, reference numerals 7 and 10 designate shield plates composed of vertical stripes, 8 indicates an image display surface, and 9 a lenticular lens. The construction of FIG. 2A is not preferable since images are divided into vertical stripes. The arrangement of FIG. 2B is somewhat better as it does not suffer from such problems. Both systems, however, have a drawback that since images are combined by a half-silvered mirror 2, the image position is far to the rear.

In still another known three-dimensional image displaying apparatus, the slit plate 7 shown in FIG. 2A or the lenticular lens 9 shown in FIG. 2B is placed immediately in front of a reflecting screen, and an image is projected onto the screen by two or more projectors. With two projectors, however, the range in which the images can be observed is small. One known screen capable of transmitting light therethrough has two lenticular lenses disposed back to back with a diffusion surface interposed therebetween. Such a screen is disclosed by Gen Yanagisawa, "History of Three-Dimensional Television and Its Various Systems", *Graphics and Images*, Spring 1982, p. 86; see especially FIGS. 21-*a* and 21-*b*. With this system, an image is projected from a projector onto a diffusion surface and the transmitted light is viewed. The difficulty with this system is that the range in which three-dimensional images can be viewed is small. Widening the viewing range requires many projectors and results in a system of large physical size.

There is known a still further system, disclosed in Examined Japanese Patent Publication No. 57-11550, in which a special three-dimensional television picture tube is employed for displaying three-dimensional images. The picture tube required is, however, of a special and complex construction.

SUMMARY OF THE INVENTION

Accordingly, it is an object of the invention to provide an image projection apparatus capable of producing bright three-dimensional images.

It is a further object of the invention to provide such an image projection apparatus in which the image can be viewed over a relatively wide range of viewing angles.

In accordance with the above and other objects of the invention, there is provided a projected image displaying apparatus including image source means and image displaying means, with the image source means being used to optically project two-dimensional images onto the image displaying means. The image displaying means includes, in one preferred embodiment, a transmissive diffusion surface onto which images produced by the image source means are projected, a shield plate composed of a plurality of vertically oriented stripes disposed on a side of the transmission diffusion surface adjacently image source means for projecting the images onto the transmissive diffusion surface in the form of overlapping, interleaved stripes, and a lenticular lens disposed on the side of the transmissive diffusion surface opposite the image source means.

In another preferred embodiment, the image source means comprises means for projecting first through third energy beams representing images of the three primary colors, red, green and blue. In this embodiment, the image displaying means includes a substrate capable of transmitting light therethrough, a light-emitting layer disposed on the substrate, and a shield plate of the type described above spaced from the light-emitting layer for directing the energy beams corresponding to images in the three primary colors from the image source means onto the light-emitting layer in such a manner as to maintain the projected beams interleaved with one another on the light-emitting layer. The light-emitting layer includes a plurality of each of first through third phosphor stripes receptive of the respective first through third energy beams with the first through third stripes being arranged parallel to one another in repetitive sequences.

BRIEF DESCRIPTION OF THE DRAWINGS

FIG. 1 is a view showing the arrangement of a conventional three-dimensional television display apparatus;

FIGS. 2A and 2B are, respectively, views of a slit plate and lenticular lens plate, placed directly in front of a display surface of the conventional display apparatus;

FIG. 3 shows a three-dimensional television display apparatus constructed according to a preferred embodiment of the present invention;

FIG. 4 is a perspective view of a screen for displaying three-dimensional images in the three-dimensional television display apparatus shown in FIG. 3;

FIGS. 5 and 6 show modified screens for displaying three-dimensional images;

FIG. 7 shows a phosphor screen of a projection image tube constructed acaccording to another embodiment of the present invention;

DESCRIPTION OF THE PREFERRED EMBODIMENTS

Figure 8A:
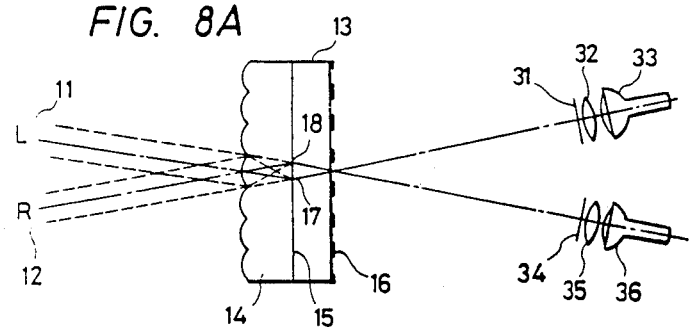
FIG. 8A is a plan view of a three-dimensional image display apparatus for displaying colored three-dimensional images according to still another embodiment of the present invention.

The present invention will hereinafter be described in detail with reference to the drawings.

FIGS. 1, 2A and 2B show a conventional three-dimensional television system as described above. The slit plate or lenticular lens plate as shown in FIG. 2A or 2B is placed in each of the positions 3 and 4 illustrated in FIG. 1. The surface 8 or 10 is positioned in overlapping relation to the image display surfaces of the image tubes 5 and 6. As mentioned above, the prior art system as illustrated is disadvantageous in that a displayed image appears positioned to the rear. Also, it may be mentioned that the screen is relatively dark since the viewer views only light that has been transmitted through the half-silvered mirror.

FIG. 3 is a view illustrative of the principles of a three-dimensional display apparatus according to a first preferred embodiment of the present invention. Designated at 11 is the position of the left eye of a viewer and at 12 the position of the right eye of the viewer. An image displayed by a projection image tube 20 is directed by a lens 19 to a shield plate 16 having vertical stripes. The image is then projected onto a diffusion surface 15. Similarly, an image displayed by a projection image tube 22 is directed by a lens 21 to the vertically striped shield plate 16, and is then projected onto the diffusion surface 15. The image for the left eye, which is produced by the projection image tube 20, is projected onto the diffusion surface 15 in the vicinity of an area 17 thereof, while the image for the left eye, which is produced by the projection image tube 22, is projected onto the diffusion surface 15 in the vicinity of an area 18 thereof, with the stripes of the two images being interleaved. The images having passed through the diffusion surface 15 are separated by a lenticular lens 14 into an image which can be viewed in the direction of the viewer's right eye 12 and an image which can be viewed in the direction of the viewer's left eye 11. More specifically, the image in the vicinity of the area 17 of the diffusion surface 15 is projected in the direction of the left eye 11 while the image in the vicinity of the area 18 of the diffusion surface 15 is projected in the direction of the right eye 12. Thus, the two images can be viewed as a three-dimensional image. The lenticular lens plate 14, the diffusion surface 15, and the vertically striped shield plate 16 jointly constitute a three-dimensional image screen 13.

FIG. 4 is a perspective view showing the three-dimensional image screen 13 of FIG. 3 in greater detail.

With such an arrangement, the images from the projection image tubes 20 and 22 are projected onto the diffusion surface 15 as interleaved vertical stripes. The image stripes should preferably have some overlap. With this construction, the displayed three-dimensional image can be viewed even if the viewer moves laterally a small distance, and hence the range in which images can be seen is widened. When the viewer moves to the right, the three-dimensional image being viewed appears to be shifted to the left, and when the viewer moves to the left, the three-dimensional image being viewed appears to be shifted to the right, which is usually not objectionable.

With the construction of FIG. 3, if the screen 13 is relatively large in size, the image on the diffusion surface in lateral peripheral edge portions of the screen appears slightly shifted outwardly in position, and the incident angles of light rays emitted from the projection image tubes 20 and 22 falling on the screen in such lateral peripheral edge portions are angularly shifted. This reduces the quantity of light reaching the viewer, resulting in a so-called shading phenomenon. Such shading can be reduced by placing a Fresnel lens 23 (FIG. 5) in front of or behind the vertically striped shield plate 16. FIG. 5 shows the Fresnel lens 23 as being positioned in front of the shield plate 16.

FIG. 6 illustrates a diffusion surface 24 arranged such that a displayed three-dimensional image will not appear inverted when it is viewed in a lateral direction rather than head on. The combination of the diffusion surface and the lenticular lens plate has been proposed by Japanese Laid-Open Patent Publication No. 50-96228. Other proposals for preventing three-dimensional images from appearing inverted are disclosed in Examined Japanese Utility Model Publication No. 51-213 and Japanese Laid-Open Patent Publications No. 50-96227. The construction of the diffusion surface per se, however, is not part of the present invention.

FIG. 7 shows a three-dimensional image display apparatus according to another embodiment of the present invention. More specifically, FIG. 7 illustrates a phosphor screen 26 of a projection image tube corresponding to the projection image tube 20 or 22 shown in FIG. 3. While the phosphor screen illustrated in FIG. 3 emits light over its entire surface, the phosphor screen of FIG. 7 is composed of vertical stripes 28 which emit light separated by vertical stripes 27 which emit no light. This arrangement is effected by a uniform phosphor screen 26 and a vertically striped shield plate 25 positioned directly in front of the phosphor screen 26. Accordingly, a vertically striped image is produced. Images from the left-eye and right-eye image tubes are projected onto the diffusion surface 15 in overlapping interleaved stripes, as described before. With this embodiment, no shield plate 16 as shown in FIGS. 3 and 4 is required.

Rather than placing the shield plate immediately in front of the phosphor screen 26 as shown in FIG. 7, a vertically striped electrode may be provided for shielding the electron beam falling on the phosphor screen 26. With such an arrangement, the portions indicated by 27 in FIG. 7 contain luminescent phosphor but emit no light. The manner in which images are projected onto the diffusion surface 15 remains as described above.

As another arrangement for implementing the embodiment of FIG. 7, a beam blanking process can be employed whereby the electron beam which scans the phosphor screen 26 is periodically cut off by an external circuit for producing a vertically striped image. This process is also capable of producing vertically striped left-eye and right-eye images which can be projected onto the diffusion surface 15 in the desired overlapping, interleaved pattern. Any of the arrangements described above allow the viewer to observe a three-dimensional image at the viewing points 11 and 12.

The present invention is not to be interpreted as being limited to the foregoing embodiments, but includes various modifications. Three-dimensional images can be viewed in color by employing color image tubes instead of monochrome image tubes as the projection image tubes 20 and 22.

For achieving a three-dimensional color television display apparatus, it would be a simple matter to use color image tubes for the projection image tubes 20 and 22 shown in FIG. 3. However, no projection image tube is generally available at the present time which is capable of displaying images in colors.

Figure 8B:
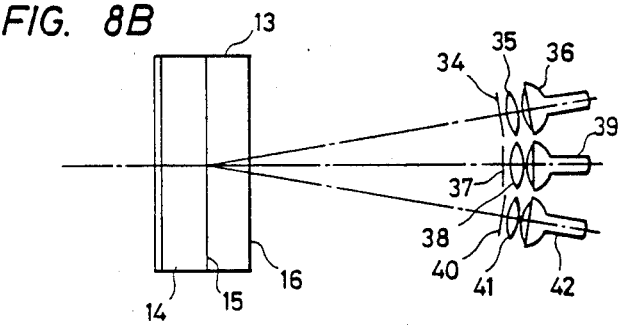
FIG. 8B is a side elevational view of the three-dimensional image display apparatus illustrated in FIG. 8A.

Three-dimensional images can be displayed in color by the system shown in FIGS. 8A and 8B. More specifically, the arrangement of FIG. 8A is similar to that of FIG. 3, but differs therefrom in that color filters 31 and 34 are added. FIG. 8A is a plan view of this system, while FIG. 8B is a side elevational view. As shown in FIG. 8B, a projection image tube 36 emits red light which is projected through a projection lens 35 and a red-pass filter 34 onto a diffusion surface 15. A projection image tube 39, a projection lens 38, and a green-pass filter 37 serve to project green light onto the diffusion surface 15. Likewise, a projection image tube 42, a projection lens 41, and a blue-pass filter 42 serve to project green light onto the diffusion surface 15. The projection image tubes and related components shown in FIG. 8B are used only for forming the right-eye image. A projection image tube 33, a projection lens 32, and a red-pass filter 31 illustrated in FIG. 8A serve to project red light onto the diffusion surface 15 for a left-eye image. Below the projection image tube 33, the projection lens 32, and the red-pass filter 31, there are provided similar components for projecting images of green and blue light for the left eye using the same arrangement as shown in FIG. 8B.

The vertically striped images of red, green and blue light in FIG. 8B are projected onto the transmissive diffusion surface 15, and the images of three colors in one set are overlapped as one vertical stripe image which appears as a colored image. The images thus formed appear as a colored three-dimensional image at the viewing points 11 and 12.

While the projection image tubes for red, green and blue light are arranged in FIG. 8B in the stated order in the vertical direction, the projection image tubes are not limited to such an order, and may be arranged in any other sequence. Also, the projection image tubes for the left and right eyes need not be arranged in the stated order, and may be in any desired sequence.

Schmidt optical systems including projection optics may be employed as the projection image tubes 20, 22, 33 and 36, 39, 42 as shown in FIGS. 3 and 8. With a Schmidt system, the optical components 19, 21 and 32, 35, 38, 41 indicated in FIGS. 3 and 8 may be dispensed with, and the shield plate placed directly in front of the phosphor screen surface doubles as an electrode plate for shielding the electron beam. The latter effect is due to the fact that the electron beam strikes the phosphor screen in the same direction with respect to the plane of the phosphor screen as that in which light is emitted from the phosphor screen.

While two projection image tubes are shown in FIGS. 3 and 8, as many projection image tubes as desired may be disposed in the lateral direction, provided a plurality of such projection image tubes are included. The more projection image tubes, the greater will be the realisticness of the displayed three-dimensional images. As the number of projection image tubes is increased, the intervals between slits in the shield plate 16 should of course be correspondingly decreased to reduce the image overlap on the diffusion surface.

Figure 9:
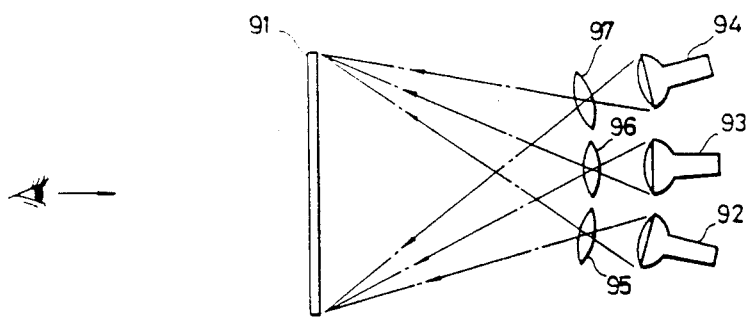
FIG. 9 is a plan view of a projection television apparatus according to a further embodiment of the present invention.

FIG. 9 is a side elevational view of a projection television apparatus according to the present invention. The projection television apparatus shown in FIG. 9 has a screen 91, cathode-ray tubes 92, 93 and 94 for displaying images in red, green, and blue, respectively, and the optical systems 95, 96 and 97 for projecting the color images displayed on the cathode-ray tubes 92, 93 and 94 respectively, onto the screen 91. The light rays representative of the color images projected onto the screen 91 have different incident angles.

Figure 10:
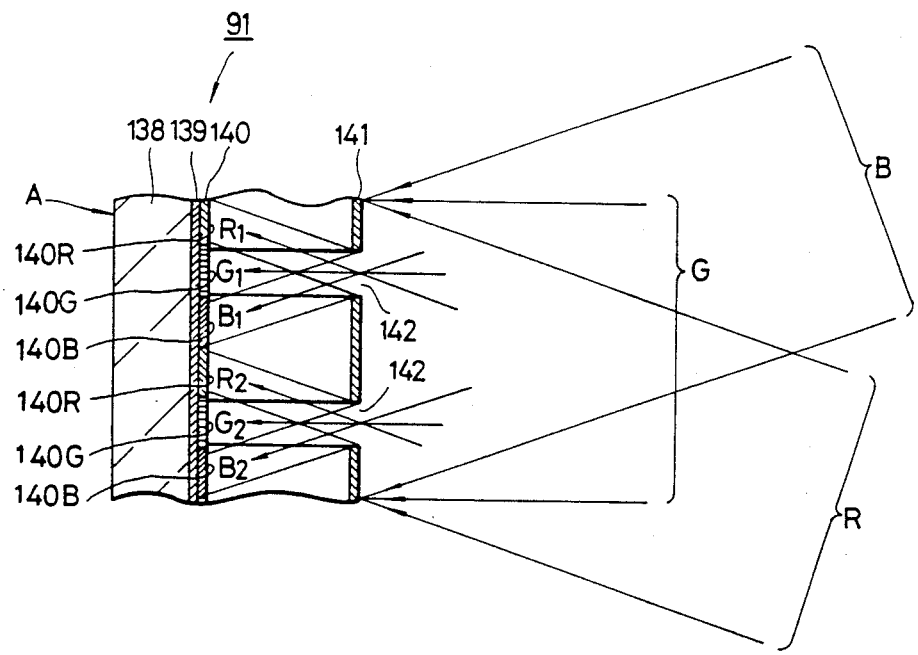
FIG. 10 is a fragmentary enlarged cross-sectional view of a screen of the projection television apparatus shown in FIG. 9.

FIG. 10 is a fragmentary enlarged cross-sectional view of the screen 91 illustrated in FIG. 9. A substrate 138, which is made of glass or synthetic resin capable of transmitting light, has a surface A where a projected image is observed. The substrate 138 is coated on the entirety of its reverse side with a uniform light-diffusing layer 139 serving to mix colors well and thus enlarge the range in which images can be observed. A light-emitting layer 140 coated on the surface of the light-diffusing layer 139 is composed of repeating sequences of phosphor stripes 140R, 140G and 140B respectively emitting the three primary colors of light, that is, red, green, and blue. A shield plate 147 is spaced a predetermined distance from the light-emitting layer 140 in a confronting relation thereto. The shield plate 141 has a multiplicity of apertures 142 formed therein for guiding images projected from the cathode-ray tubes 92 to 94 shown in FIG. 9 as image projectors onto the phosphor stripes 140R, 140G and 140B so that the images will not overlap each other. Also, designated in FIG. 10, at R, G and B, are light rays of projected images in red, green and blue, respectively, which are generated from the cathode-ray tubes 92, 93 and 94 via their respective optical systems.

The projection television apparatus of the foregoing embodiment operates as follows. The red image produced by the cathode-ray tube 92 is projected by the optical system 95 onto the screen 91. Since the shield plate 141 is disposed in front of the light-emitting layer 140 of the screen 91, only a portion of the light rays R of the red image passes through the apertures 142 in the shield plate 141 and falls on the phosphor stripes 140R, as indicated by the arrows $R_1$ and $R_2$ in FIG. 10. As a result, the phosphor stripes 140R emit red light due to excitation by the light rays R of the red image. Likewise, the light rays G of the green image and the light rays B of the blue image are supplied from the cathode-ray tubes 93 and 94, respectively, and fall on the respective phosphor stripes 140G and 140B, passing through the apertures 142 in the shield plate 141. The phosphor stripes 140G and 140B are thus excited to emit green and blue light. Light rays in the three primaries thus emitted by the phosphor stripes 140R, 140G and 140B are diffused by the light diffusion layer 139 so as to be mixed together and enlarge the range in which the image can be observed. Thereafter, the light rays pass through the transmissive substrate 138 toward the viewer.

Accordingly, projected images can be displayed in color at a high brightness level by light rays of the respective image colors which are, in turn, produced by light rays (which may be visible light, infrared or ultraviolet radiation, for example) emitted from the cathode-ray tubes 92, 93 and 94 which excite the phosphor stripes 140R, 140G, and 140B.

Figure 11:
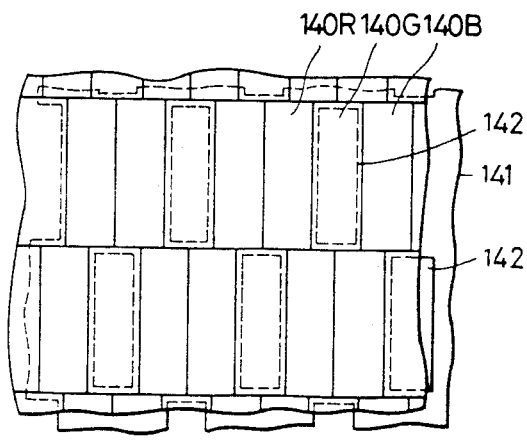
FIG. 11 is a fragmentary elevational view showing a screen according to still another embodiment.

While in the foregoing embodiment the phosphor stripes 140R, 140G and 140B have been described as being arranged in stripes, the apertures 142 may be formed in the shield plate 141 in a staggered pattern as shown in FIG. 11 and the phosphor stripes 140R, 140G and 140B disposed in positions corresponding to the apertures 142. In such an arrangement, the quality of images displayed is improved since the three colors are well mixed. To increase the contrast of the displayed images, each of the phosphor stripes should be peripherally enclosed by a light-absorbing material such as carbon, or the viewing surface of the substrate 138 should be arranged such that it will absorb extraneous light falling thereon.

Figure 12:
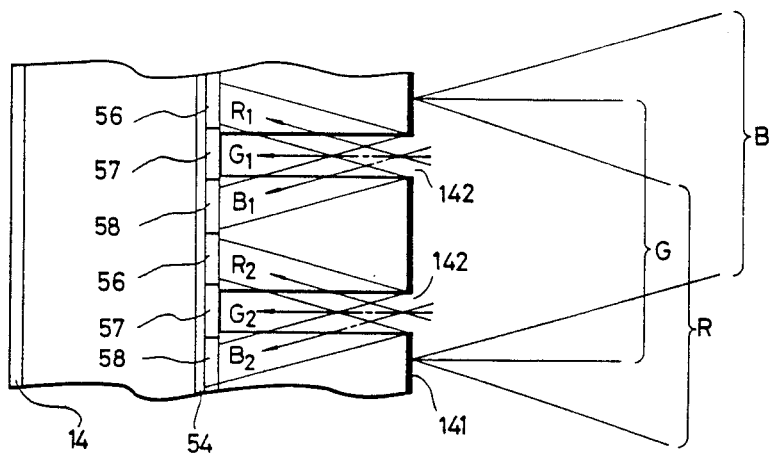
FIG. 12 is a fragmentary cross-sectional view of a screen of the projection television apparatus according to a modification of the embodiment shown in FIG. 9 and 10.

FIG. 12 is a cross-sectional view, similar to the view of FIG. 10, illustrating a screen which can be used in the three-dimensional displaying apparatus of FIG. 3. In this case, the image source may emit any of visible light, infrared light or ultraviolet light. Accordingly, stripes 56, 57 and 58 of fluorescent material for emitting red, green and blue light, respectively are disposed on the face of a base of substrate adjacent the shield plate 41. A diffusion layer 54 or the like is disposed under the fluorescent stripes 56, 57 and 58. As in the case of FIG. 3, a lenticular lens is provided.

Figure 13:
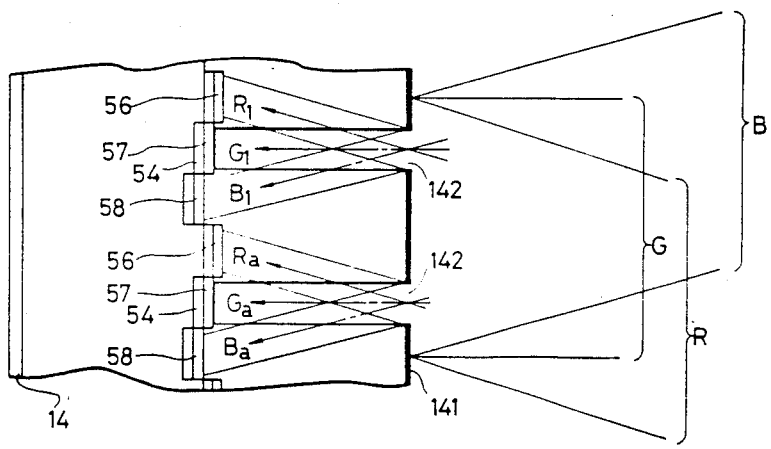
FIG. 13 shows a modification of the screen shown in FIG. 12.

FIG. 13 shows a modification of the screen of FIG. 12 in which the light-emitting portions for each of red, green and blue are offset in the longitudinal direction with respect to one another. The purpose for the relative offsets is to compensate for differences in wavelengths among the red, green and blue light. More particularly, the radius of the curvature of the lenticular lens 14 is constant at any portion thereon, but the wavelength of the image portions in the three different primary colors are different, so that the reflective index of the lenses are different for these three colors, thereby producing a displacement of the three images. Such displacement is compensated for with the arrangement of FIG. 13.

Figure 14A:
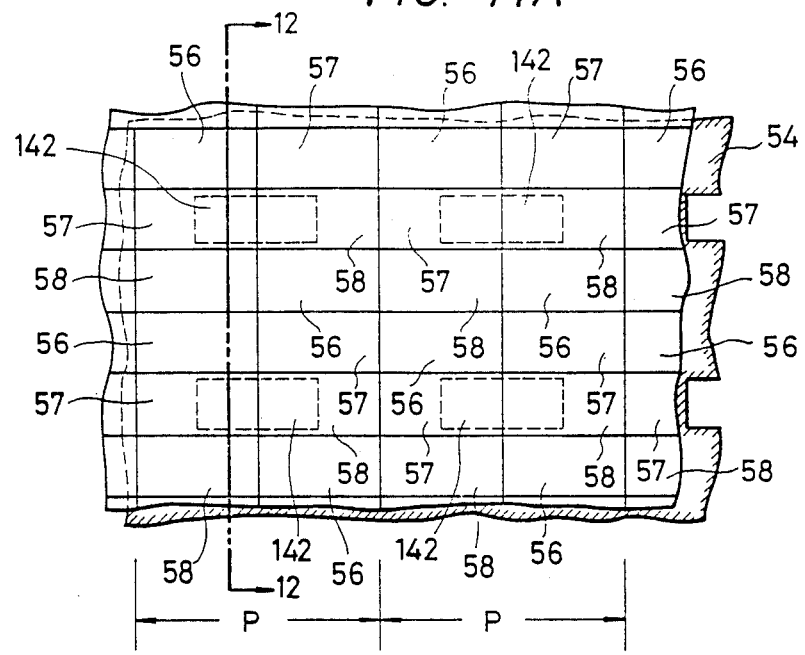
FIG. 14A and 14B are fragmentary elevational view showing screens shown in FIG. 12 or 13.
Figure 14B:
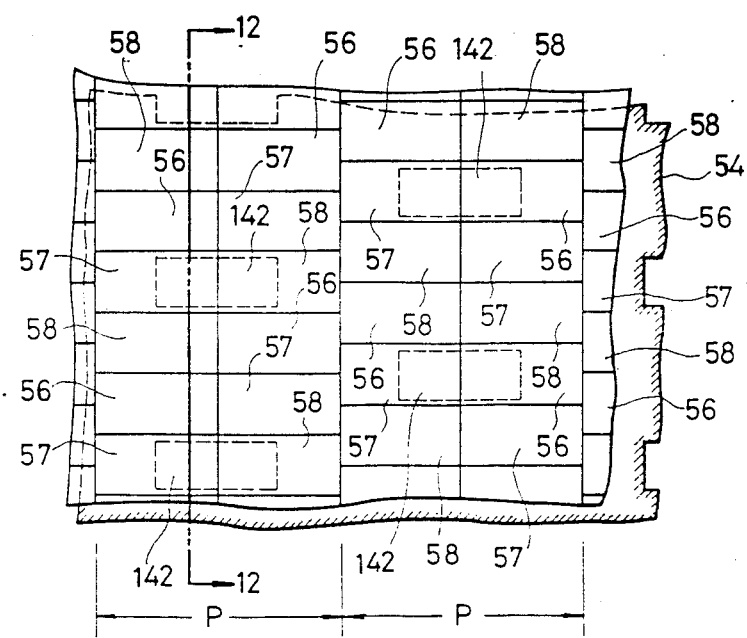

Finally, FIGS. 14A and 14B are front views of a screen of the type of FIGS. 12 or 13. In the case of FIG. 14A, the light-emitting stripes 56, 57 and 58 are arranged in a regular rectangular pattern, while in the arrangement of FIG. 14B, an offset is provided between paris of two adjacent columns of the stripes.

With the projection television apparatus of the present invention as described above, images in the three primary colors are displayed by three respective cathode-ray tubes, and light rays representative of such images are projected from different positions through apertures in a shield plate onto corresponding light-emitting portions of phosphor stripes which constitute a screen, thereby causing the phosphor stripes to display a color image which can be directly observed. Therefore, the displayed image is much brighter than in a conventional device.

I claim:

1. A projected image displaying apparatus including image source means and image displaying means spaced from said image source means, said image source means optically projecting two-dimensional images onto said image displaying means, said image displaying means comprising a transmissive diffusion element onto which said images produced by said image source means are projected, a striped shield plate with alternating light blocking stripes and light transmitting stripes disposed on a surface of said transmissive diffusion element adjacent to said image source means for projecting said images onto said transmissive diffusion element in the form of partially overlapping, interleaved stripes, and a lenticular lens plate disposed on a surface of said transmissive diffusion element opposite from said image source means for displaying the images from the diffusion element as a three-dimensional image.

2. The projected image displaying apparatus as claimed in claim 1, wherein said image source means comprises a plurality of image sources, each projecting a two-dimensional image through said shield plate and onto said transmissive diffusion element in a predetermined wavelength range of visual light.

3. The projected image displaying apparatus as claimed in claim 2, further comprising a Fresnel lens disposed adjacent said shield plate on a side of said shield plate adjacent said image source means.

4. The projected image displaying apparatus as claimed in claim 2, wherein said shield plate and said lenticular lens plate have, at their respective surfaces on said diffusion element, a zig-zag interface having a pitch equal to the pitch of stripes on said shield plate.

5. The projected image displaying apparatus as claimed in claim 1, wherein said image source means comprises a plurality of image sources for projecting two-dimensional monochrome images within a wavelength of visual light through said shield plate and onto said transmissive diffusion element.

6. The projected image displaying apparatus as claimed in claim 1, wherein said image source means comprises a plurality of pairs of image sources, each pair of image sources projecting images in a respective one of red, green and blue colors onto said transmissive diffusion element.

7. The projected image displaying apparatus as claimed in claim 6, further comprising a Fresnel lens disposed adjacent said shield plate on a side of said shield plate adjacent said image source means.

8. The projected image displaying apparatus as claimed in claim 4, wherein said shield plate and said lenticular lens plate have, at their respective surfaces on said diffusion element, a zig-zag interface having a pitch equal to the pitch of stripes on said shield plate.

* * * * *